United States Patent

Sato et al.

[11] Patent Number: 5,764,450
[45] Date of Patent: *Jun. 9, 1998

[54] MAGNETIC HEAD

[75] Inventors: Heikichi Sato; Hitoshi Kimura, both of Miyagi, Japan

[73] Assignee: Sony Corporation, Tokyo, Japan

[*] Notice: The term of this patent shall not extend beyond the expiration date of Pat. No. 5,640,291.

[21] Appl. No.: 829,380

[22] Filed: Mar. 31, 1997

Related U.S. Application Data

[63] Continuation of Ser. No. 551,040, Oct. 31, 1995, Pat. No. 5,640,291.

[30] Foreign Application Priority Data

Oct. 31, 1994 [JP] Japan ................... 6-290494
Oct. 31, 1994 [JP] Japan ................... 6-290495

[51] Int. Cl.$^6$ ............................ G11B 5/127; G11B 5/147
[52] U.S. Cl. ................................................ 360/125
[58] Field of Search ..................................... 360/125, 126

[56] References Cited

U.S. PATENT DOCUMENTS

| | | | |
|---|---|---|---|
| 4,393,428 | 7/1983 | Fujimura | 360/125 X |
| 4,794,483 | 12/1988 | Naitoh et al. | 360/125 X |
| 5,276,575 | 1/1994 | Kobayashi et al. | 360/126 |
| 5,373,408 | 12/1994 | Bischoff et al. | 360/126 |

FOREIGN PATENT DOCUMENTS

| | | |
|---|---|---|
| A-02 466 159 | 1/1992 | European Pat. Off. . |
| A-01 496 201 | 7/1992 | European Pat. Off. . |
| A-01 4022318 | 7/1989 | Germany . |

*Primary Examiner*—John H. Wolff
*Attorney, Agent, or Firm*—Hill & Simpson

[57] ABSTRACT

A magnetic head in which a pair of magnetic core halves each having a winding slot for placing a coil are abutted and unified to each other by thin magnetic metal films interposed in-between, and in which a magnetic gap is formed between abutting surfaces of the magnetic core halves. A bend is formed in the winding slot for bending the thin magnetic metal film at an acute angle when seen in cross-section. The magnetic head has a structure for prohibiting peeling of the thin magnetic metal film.

1 Claim, 6 Drawing Sheets

MAGNETIC HEAD

This is a continuation of application Ser. No. 08/551,040 filed Oct. 31, 1995, now U.S. Pat. No. 5,640,291.

BACKGROUND OF THE INVENTION

This invention relates to a magnetic head in which a pair of magnetic core halves, each having a winding groove in which a coil is wound, are abutted and unified together via thin magnetic metal films and in which a magnetic gap is defined between the abutting surfaces of the core halves. More particularly, it relates to a magnetic head having a structure for prohibiting peeling of the thin magnetic metal films.

In a magnetic recording/reproducing apparatus, such as a video tape recorder (VTR) or a digital audio tape recorder (RDAT), investigations for reducing the recording wavelength of information signals are proceeding with a view to improving the picture quality. In keeping up therewith, a high-coercivity magnetic recording medium, such as a so-called metal tape employing magnetic metal powders as magnetic powders or an evaporation tape having a magnetic metal material directly deposited on a base film, has come into use.

Investigations are also being conducted in the field of the magnetic heads in connection with development of the high-coercivity magnetic recording medium. Thus, for coping with the high-coercivity magnetic recording medium, a magnetic head has been developed in which a magnetic metal material is used as a core material and the track width is reduced.

Such magnetic head is shown in FIG. 1, in which abutment surfaces of a pair of magnetic core halves 101, 102, formed of magnetic oxides, such as Mn—Zn ferrite, are partially removed for forming surfaces for forming thin magnetic metal films, and thin magnetic metal films 105, 106, formed e.g., of sendust, are formed on these forming surfaces by the vacuum thin film forming technique. These thin magnetic metal films 105, 106 are abutted to each other for forming a magnetic gap 107. A slide contact surface for a magnetic tape is formed in a track width control groove and a low-melting glass or high-melting glass 108 is charged in the track width control groove for prohibiting abrasion of the thin magnetic metal films 105, 106.

On the abutting surfaces of the magnetic core halves 101, 102, there is formed a winding slot 109 for placing a coil therein and for controlling the depth d of a magnetic gap 107. The winding slot 109 is comprised of an upper inclined portion 109a for controlling the depth d of the magnetic gap 107 and a bottom 109b having a value of Rmax approximately 0.2 μm by roughening. The winding slot 109 encompasses not only the sole window type in which the slot is formed in only one of the magnetic core halves but also the dual window type in which the slot is formed in each of the magnetic core halves 101, 102.

For producing this sort of the magnetic head, a pair of core blocks are fabricated through a process including a step of forming grooves in a substrate of a magnetic oxide and forming a thin magnetic metal film, a step of charging fused glass 108 and machining the surface to a mirror finish. These core blocks are abutted together to form a unified block which is sliced into magnetic head chips and a coil is placed in each of the magnetic chips.

In abutting the magnetic core halves, on each of which a thin magnetic metal film is formed, for unifying these core halves, there is produced a force of stress at the time of forming these films 105, 106 and thermal stress induced when charging the fused glass in the track width control groove thus lowering adhesion in an interface between the films 105, 106 and the ferrite. The result is that the thin magnetic metal film tends to be peeled during the subsequent step of chip slicing and coil winding.

For overcoming this inconvenience, it may be contemplated to use specific shapes of the inclined section 109a of the winding slot 109 controlling the depth of the magnetic gap 107, or to charge the fused glass as far as a winding section 109c of the winding slot 109, as shown in FIG. 2. However, this may lead to difficulties in placing the coil in the slot in the subsequent coil winding step.

OBJECT AND SUMMARY OF THE INVENTION

It is therefore an object of the present invention to provide a magnetic head in which the force of stress incurred during formation of the thin magnetic metal film is relaxed to prevent peeling of the magnetic tin films interposed between magnetic core halves as well as to eliminate any adverse effects on magnetic characteristics of the magnetic head.

According to the present invention, there is provided a magnetic head in which a pair of magnetic core halves, each having a winding slot for placing a coil therein, are abutted and unified to each other by thin magnetic metal films interposed in-between, and in which a magnetic gap is formed between abutting surfaces of the magnetic core halves. A bend is formed in the winding slot for bending the thin magnetic metal film at an acute angle when seen in cross-section.

If the angle of the bend is a right angle or an obtuse angle, the force of stress incurred during formation of the thin magnetic metal film cannot be effectively relaxed, while the peeling of the thin magnetic metal film incurred during the production process of the magnetic head becomes continuous, so that effective peeling prevention cannot be achieved.

Such bend may be provided in the winding slot formed in each of the magnetic core halves.

According to the present invention, since the thin magnetic core halves are bent at an acute angle, the force of stress incurred during formation of the thin magnetic metal films and during charging of the fused glass in the track width control groove is relaxed without operating continuously in a pre-set direction, thus improving adhesion of the thin magnetic metal films.

On the other hand, if peeling of the thin magnetic metal film is incurred at one of the sides defining the acute angle, such peeling is fractionated at the bend of the acute angle without affecting the opposite side, so that the effect of peeling is isolated from the vicinity of the magnetic gap without deteriorating the performance of the magnetic head.

DETAILED DESCRIPTION OF THE PREFERRED EMBODIMENTS

Figure 1:
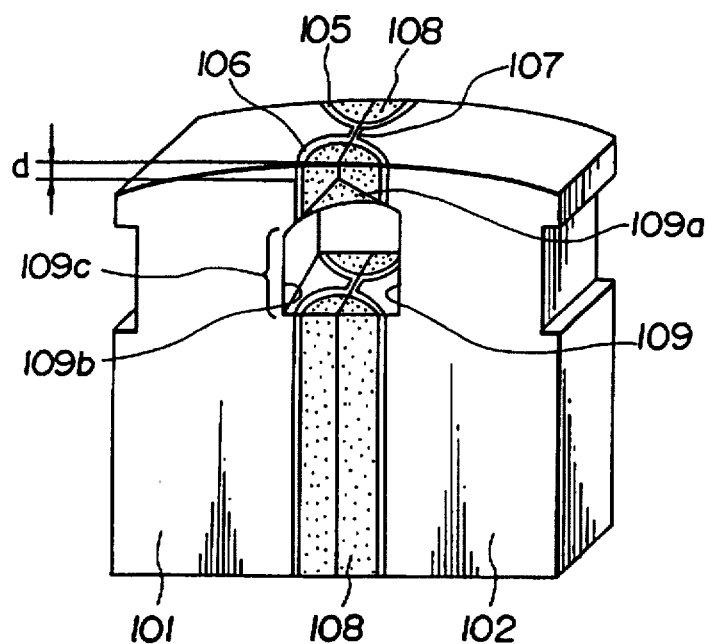
FIG. 1 is a perspective view showing an illustrative conventional magnetic head.
Figure 2:
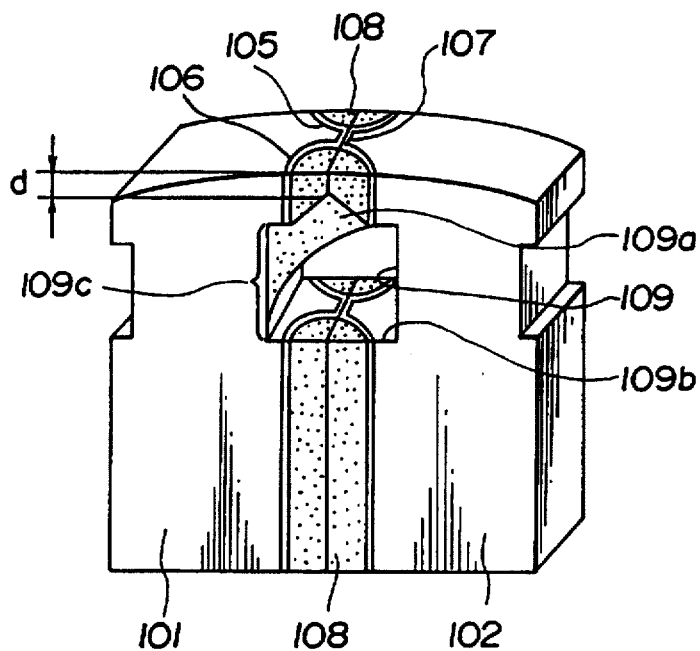
FIG. 2 is a perspective view showing another illustrative conventional magnetic head.

Referring to the drawings, preferred embodiments of a magnetic head according to the present invention will be explained in detail.

Figure 3:
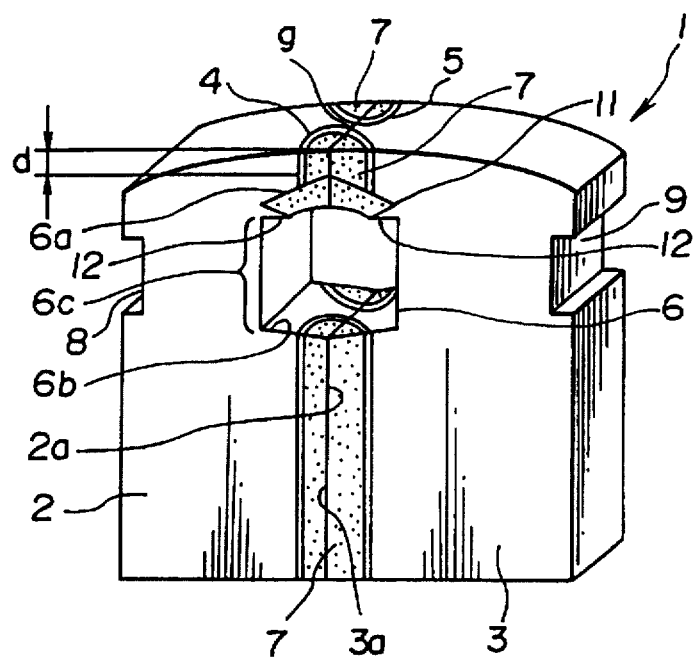
FIG. 3 is a perspective view showing an embodiment of a magnetic head according to the present invention.
Figure 5:
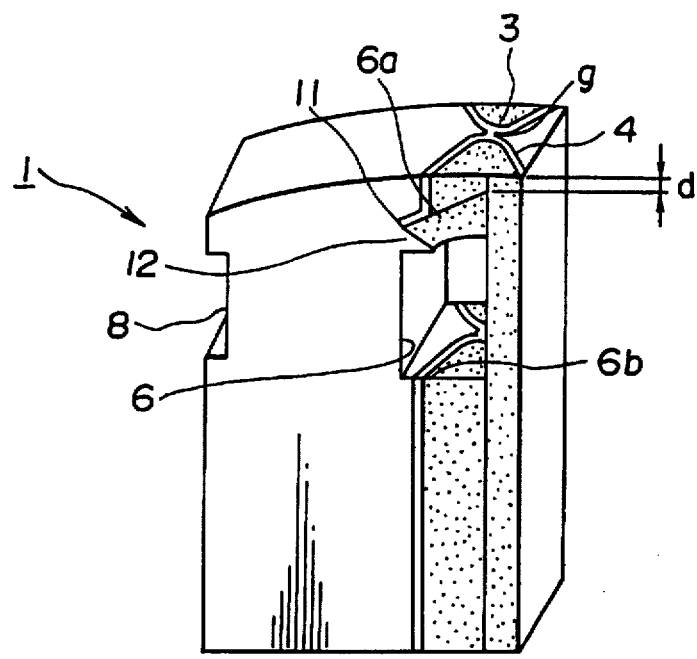
FIG. 5 is a perspective view showing a modified embodiment of a magnetic head according to the invention, with one of the magnetic core half sides removed.
Figure 6:
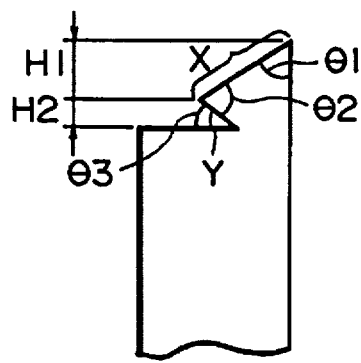
FIG. 6 is a schematic front view showing the shape of a winding slot of the magnetic head shown in FIG. 5.

The magnetic head of the present embodiment is prepared by combining a pair of magnetic cores 2, 3 by abutting and bonding thin magnetic metal films 4, 5 deposited on abutting surfaces 2a, 3a thereof to each other and by forming a magnetic gap g operating as a recording/reproducing gap on the abutting surfaces 2a, 3a, as shown in FIGS. 3 and 5. FIG. 5 shows a single window type magnetic head embodying the present invention.

The magnetic cores 2, 3 are formed of a magnetic oxide, such as Mn—Zn based ferrite. A winding slot 6 for placing a coil C therein and for controlling the depth d of the magnetic gap g is formed on the abutting surfaces 2a, 3a of the magnetic cores 2, 3.

In the instant embodiment, a surface 6b of the bottom of the winding slot 6 is a roughened surface with the surface roughness being on the order of 5 μm in terms of the maximum height Rmax prescribed in JIS B 0601. By forming the surface 6a as the roughened surface, part of the thin magnetic metal films 4, 5 is affixed to the roughened surface thus realizing a highly efficient head structure which is high in adhesion and mechanical strength and in which the pseudo-gap from the connecting portion between the ferrite and the thin magnetic metal films 4, 5 is substantially negligible. In addition, the magnetic head may be fabricated highly efficiently and accurately by the production process which will be explained subsequently.

In particular, with the magnetic head 1 of the instant embodiment, bent portions 11, 11 for bending the thin magnetic metal films 4, 5 at an acute angle are formed at an inclined section 6a of the winding slot 6. These bends 11, 11 operate for prohibiting the peeling of the thin magnetic metal films 4, 5. When seen in the vertical cross-sectional view of FIG. 4, each bent portion 11 includes an acute angle θ2 between sides X and Y facing the abutting surfaces 2a, 3a of the magnetic core halves 2, 3.

Figure 4:
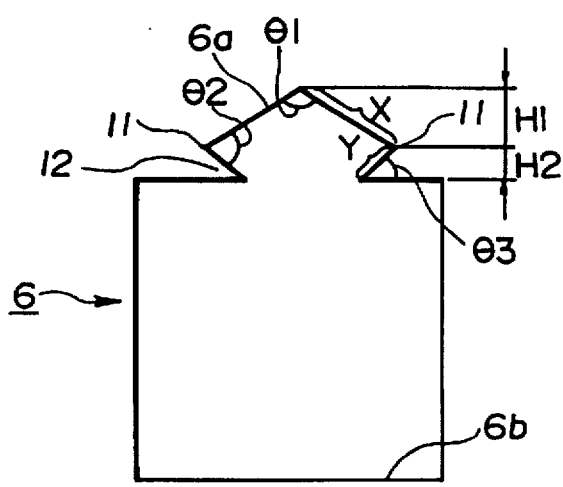
FIG. 4 is a schematic front view showing the shape of a winding slot of the magnetic head shown in FIG. 3.

With the magnetic head 1 of the instant embodiment, protrusions 12, 12 are formed in continuation to the bent portions 11, 11, as shown in FIG. 4.

The bent portions 11, 11 are formed in the inclined section 6a of the winding slot 6. The angle θ1 of the inclined section 6a is preferably 20° to 70° with respect to the depth d of the magnetic gap g.

The bent portions 11, 11 are sized so that a height H1 associated with the side X is 0.1 to 0.3 mm and a height H2 associated with the side Y is 0.01 to 0.1 mm.

If the angle θ2 of the bends 11, 11 is an obtuse angle or a right angle, the force of stress induced during formation of the thin magnetic metal films 4, 5 is not continuous and cannot be relaxed. In addition, peeling of the thin magnetic metal films 4, 5 incurred during the production process of the magnetic head 1 becomes continuous so that effective peeling prevention cannot be achieved.

Conversely, if the angle θ2 of the bends 11, 11 is an acute angle, the force of stress is fractionated. On the other hand, if the peeling of the thin magnetic metal films 4, 5 is incurred only at the side Y on one side of the acute angle θ2, the flow of peeling of the thin magnetic metal films 4, 5 is fractionated at the bend 11 so that the opposite side X is not affected by the peeling. Thus the vicinity of the magnetic gap g, which represents a crucial portion in producing the playback output, is not affected by the peeling, thus prohibiting deterioration in the performance of the magnetic head. In addition, the thin magnetic metal films 4, 5 may be further improved in adhesion, in conjunction with the favorable effect of the roughened surface 6b of the bottom of the winding slot 6, thus improving mechanical strength.

On the other hand, the protrusions 12, 12, operating for prohibiting peeling of the thin magnetic metal films 4, 5, also operate for prohibiting flow of the fused glass 7.

The lateral sides of the magnetic cores 2, 3, facing the winding slot 6, are formed with winding guide grooves 8, 9 for improving the winding state of the coil C placed in the winding slot 9.

The magnetic cores 2, 3, with the thin magnetic metal films 4, 5 interposed in-between, are bonded together by fused glass 7, and the magnetic gap g, operating as a recording/reproducing gap, is formed in the abutting surfaces 2a, 3a.

As the magnetic metal materials, employed in the instant embodiment, magnetic amorphous alloys, or so-called amorphous alloys, sendust, which is an Fe—Al—Si based alloy, an Fe—Al—Si based alloy, an Fe—Al based alloy, an Fe—Ni based alloy, an Fe—Si based alloy, an Fe—Ga—Si based alloy, a Ga—Si—Ru based alloy or permalloy, may be employed. The amorphous alloys may be enumerated by metal-metalloid based amorphous alloys, such as alloys composed of one or more of elements Fe, Ni and Co and one or more of elements P, C, B and Si, or alloys mainly composed of the above alloys and also containing Al, Ge, Be, Sn, In, Mo, W, Ti, Mn, Cr, Zr, Hf and Nb, and metal-metal-based amorphous alloys, mainly composed of transition elements, such as Co, Hf or Zr or rare-earth elements. The magnetic metal material may be deposited as films by vacuum thin film forming techniques, such as flash evaporation, vacuum evaporation, ion plating, sputtering or cluster ion beaming.

The method for producing the magnetic head is explained with reference to production of the so-called single-window magnetic head in which only one of the magnetic core halves 2, 3 has the winding slot 6. However, the present invention is applicable to the so-called double window magnetic head having winding slots in both the magnetic core halves 2, 3.

Figure 7:
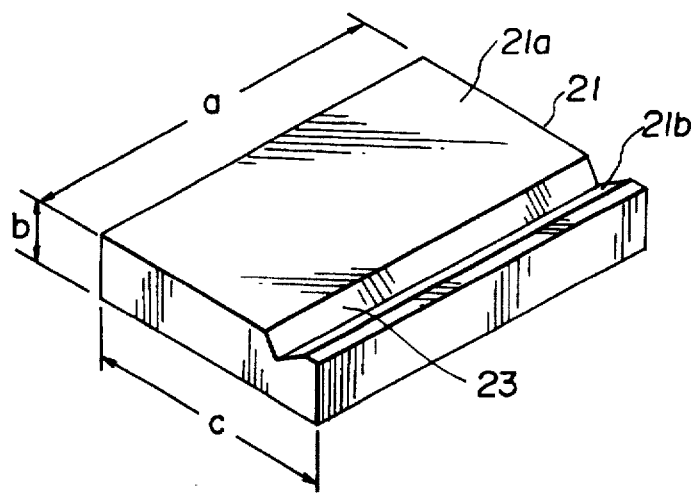
FIG. 7 is a perspective view showing a step of forming a magnetic metal film forming surface on a block substrate in the production process for the magnetic head shown in FIG. 5.
Figure 8:
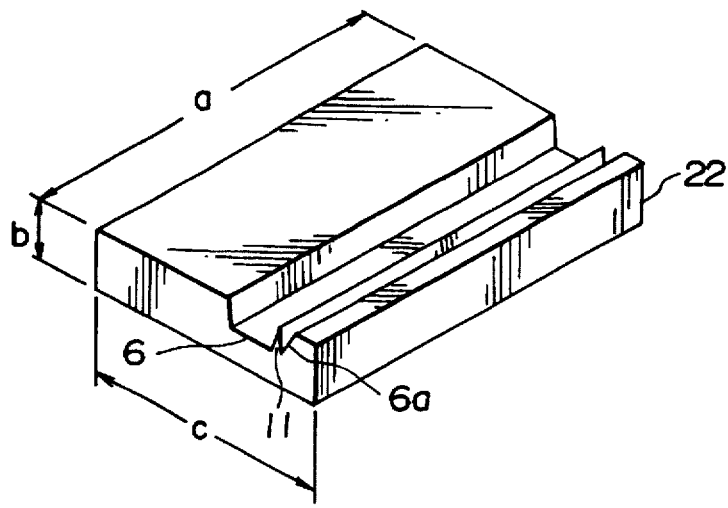
FIG. 8 is a perspective view showing a step of forming a winding slot on a substrate for superposition in the production process for the magnetic head shown in FIG. 5.

For fabricating the magnetic head according to the present invention, a parallelopiped-shaped block substrate 21 of e.g., Mn—Zn ferrite material, and a block for superposition 22, that is a block to be superposed on the block substrate, as shown in FIGS. 7 and 8, respectively, are prepared. These substrates are dimensioned so that the sides a, b and c are equal to 30 mm, 1 mm and 2 mm, respectively. An upper surface 21a of the block substrate 21 is a surface proving to be an abutment surface 2a or 3a of the magnetic gap g. On this surface 21a is formed a first groove 23 by e.g., a metal grindstone #4000 so as to be parallel to the side a. Using a metal grindstone having a distal end of 90°, a metal film forming surface 20, inclined at an angle θ4 of 45° with respect to the magnetic gap g, was formed.

Then, as shown in FIG. 8, a winding slot 6, as a second groove, was formed on the opposite side block, that is the block for superposition 22, using e.g., a metal grindstone #600. In the instant embodiment, the winding slot 6 was machined so that the distal end on the order of 0.04 μm is left from the center of the winding slot 6.

That is, the angle θ1 of the inclined section 6a of the winding slot 6 was formed so as to be 20° to 70° with respect to the depth d of the magnetic gap g. The bend 11 and the protrusion 12 contiguous to the bend 11 were then formed in the inclined section 6a of the winding slot 6 designed to control the depth d of the magnetic gap g. The bend 11 and the protrusion 12 were formed so as to have acute angles in cross-section. That is, the height H1 for the side X was set to 0.1 mm to 0.3 mm, while the height H2 for the side Y was set to 0.01 mm to 0..1 mm.

Figure 9:
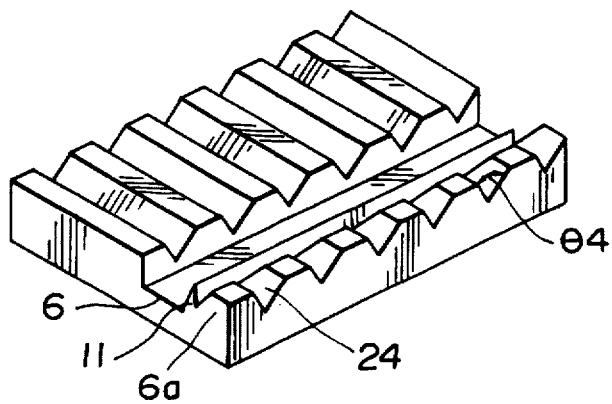
FIG. 9 is a perspective view showing a step of forming a first cut groove in the production process for the magnetic head shown in FIG. 5.

A track width control groove 24 was then formed in the block for superposition 22, as shown in FIG. 9. In the present embodiment, the track width was set to 21 μm. The angle θ4 of the track width control groove was set to 10° to 80°. Although a vee-shaped track width is produced using e.g., the metal grindstone, it may also be in a U-shape.

After machining the surface which proves to be an abutment surface for the magnetic gap g of the block substrate 21 to a mirror finish, a thin magnetic metal film 25 of a sendust or the like alloy is formed by a vacuum thin film forming technique, such as sputtering, in a groove 23 inclusive of a metal film forming surface 21b.

In the instant embodiment, the thin magnetic metal film 25 is formed for extending to the winding slot 6. However, a $ZrO_2$ film, films of metals, such as Cr, Al, Si or Pt, or alloys thereof, or a laminated film of these metal or alloy films, may also be employed in place of the $SiO_2$ film.

The thickness of the thin magnetic metal film 25 was set to 3 to 6 μm, that is one-half the width g of the effective magnetic gap g, for improving high frequency characteristics.

Figure 10:
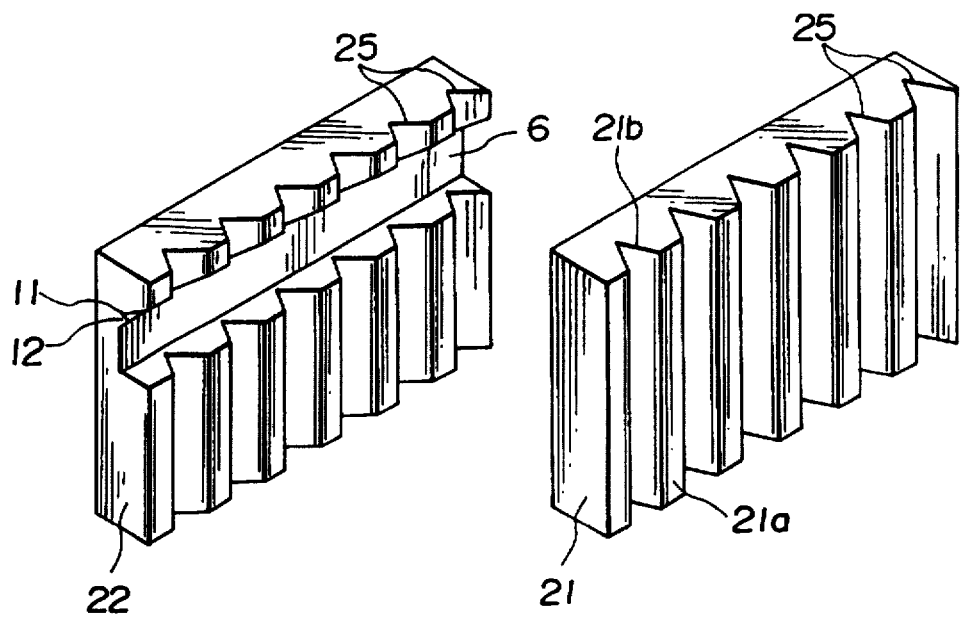
FIG. 10 is a perspective view showing a step of superimposing a substrate for superposition on a block substrate for fabricating a combined block in the production process for the magnetic head shown in FIG. 5.
Figure 11:
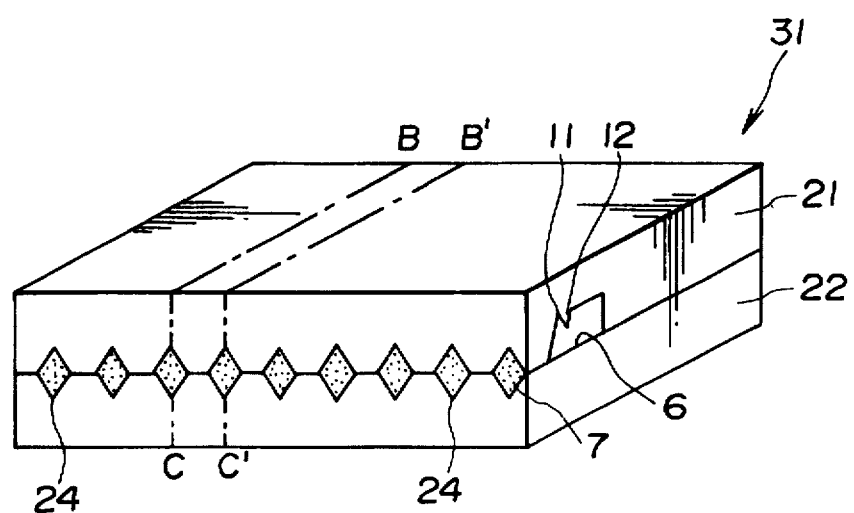
FIG. 11 is a perspective view showing a step of cutting the unified block combined from the substrate and the block substrate with interposition of the fused glass in the production process for the magnetic head shown in FIG. 5.
Figure 12:
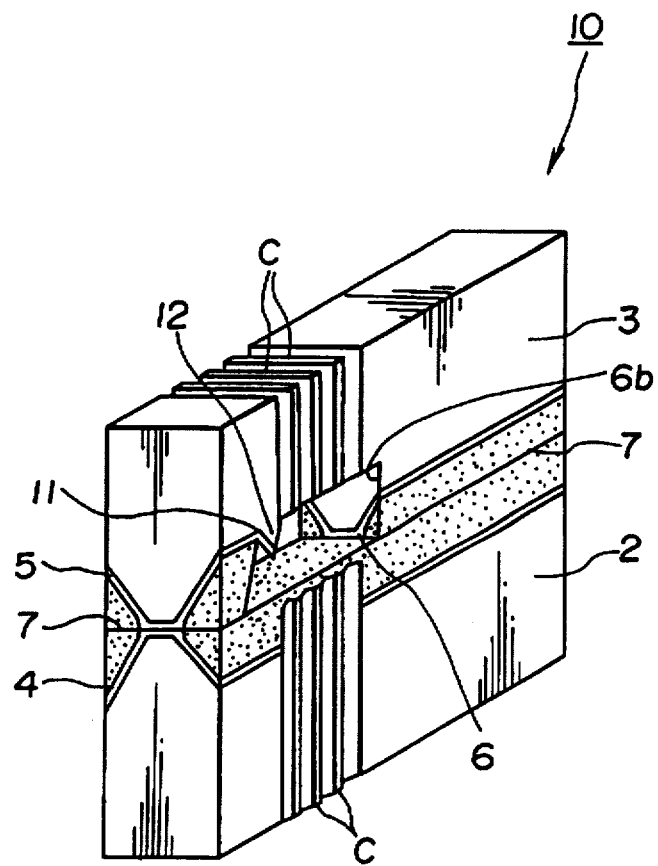
FIG. 12 is a perspective view showing a step of placing a coil in the magnetic head for fabricating a magnetic head device in the production process for the magnetic head shown in FIG. 5.

The block substrate 21 and the block for superposition 22, produced by the above process, were placed side-by-side so that the magnetic metal material constituting the track width will be abutted to each other with high precision, as shown in FIG. 10. The blocks 21, 22 are then bonded to each other for producing a unified block 31. Such bonding is effected by charging fused glass 7 into the first groove 23 of each core and in the winding slot 6. That is, a bar-shaped glass is placed in the winding slot 6 and thermally processed so that fused glass will flow into the inside of the inclined section 6a. In this case, any thermal stress induced during charging of the fused glass into the track width control groove 24 is relaxed by the bent portion 11.

The unified block 31 is then sliced along lines B and B', centered about an area of abutment of the thin magnetic metal film 25 of the track width T. An area surrounded by lines C and C', corresponding to the width of the surface of the resulting magnetic head chip which proves to be a surface on which slides the magnetic recording medium, is machined to form a recess or step for assuring that the magnetic recording medium is engaged with the recess or step. If an azimuth angle is required, the unified block is sliced with a pre-set azimuth angle.

The portion of the resulting magnetic head chip which proves to be the surface on which slides the magnetic recording medium, is ground to a cylindrical finish for completing the magnetic head 1 as shown in FIG. 5.

The coil C is placed around the magnetic head 1, thus produced, for fabricating a magnetic head device 10.

The magnetic head thus produced differs from the conventional head in that the thin magnetic metal films 4, 5 are not peeled during the production process, in particular the chip slicing and coil winding steps. In addition, magnetic characteristics of the magnetic head 1 are not affected adversely.

The reason is that, with the magnetic head 1 of the illustrated embodiment, the force of stress induced during formation of the thin magnetic metal films 4, 5 is not continued but fractionated across the sides X and Y due to the bend 11 configured for bending the thin magnetic metal films 4, 5, and that flow of peeling of the thin magnetic metal films 4, 5, occasionally incurred at e.g. the side Y of the acute angle θ2, is fractionated at the bend 11 without reaching the opposite side X, thus prohibiting the vicinity of the magnetic gap g from being affected by the peeling. If the angle θ2 of the bend 11 is a right angle or an acute angle, the peeling of the thin magnetic metal films 4, 5 produced during the production process of the magnetic head 1 is continued over the bend 11 so that effecting prevention of the peeling cannot be achieved. Since the protrusion 12 is formed in continuation to the bend 11, the fused glass 7 may be prevented effectively from flowing towards the winding section 6c.

The present invention may be applied to any magnetic head provided with the thin magnetic metal films 4, 5. That is, the present invention may be applied to a so-called metal-in-gap type magnetic head in which the thin magnetic metal films 4, 5 are formed parallel to the magnetic gap forming surface, or to a so-called laminated magnetic head in which thin magnetic metal films are sandwiched between substrates of non-magnetic material to constitute magnetic core halves which are abutted to each other and unified by glass fusion.

What is claimed is:

1. A magnetic head having a pair of magnetic core halves, and a winding slot for placing a coil therein, said core halves facing and unified to each other, said core having thin magnetic metal films interposed in-between, and in which a magnetic gap is formed between facing surfaces of the magnetic core halves, the improvement comprising:

said winding slot having opposing sidewalls each partially overlaid by one of said magnetic films, one of said sidewalls having a bend for bending one of said thin magnetic metal films into an acute angle when seen in cross-section in a plane perpendicular to a track width direction of said magnetic gap;

said respective other sidewall also comprises a bend for bending a respective other of said thin magnetic metal films into an acute angle when seen in cross-section in said plane perpendicular to said track width direction of said magnetic gap;

a protrusion formed on each of said sidewalls facing inwardly and each protrusion contiguous to one of said bends, said protrusions comprising cantilever ridges extending into said winding slot from said sidewalls;

said protrusions each have an acute angle when seen in said cross-section;

said bend is formed on an inclined section of said sidewall; and an angle of inclination of the inclined section of said wall is 20° to 70° with respect to a depth direction of the magnetic gap.

* * * * *